Figure 1:
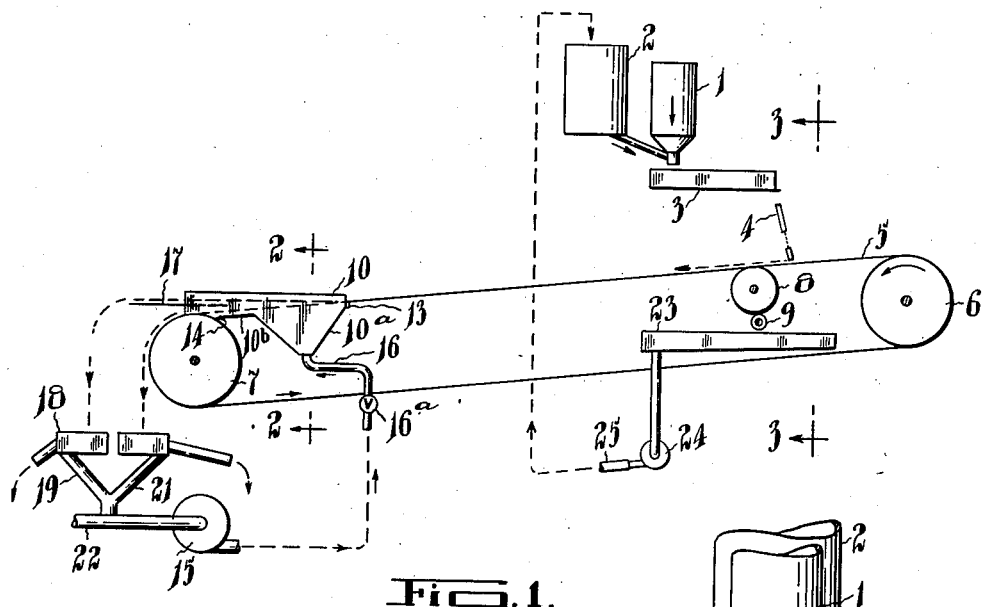

May 14, 1940.   F. C. DYER ET AL   2,200,771
APPARATUS FOR AND METHOD OF SEPARATING SEEDS

Filed Nov. 1, 1937

Inventors
F. C. Dyer
A. W. Campbell
By J. Edw. Maybee
ATTY

Patented May 14, 1940

2,200,771

UNITED STATES PATENT OFFICE 2,200,771

APPARATUS FOR AND METHOD OF SEPARATING SEEDS

Frederick Charles Dyer and Albert Wellington Campbell, Toronto, Ontario, Canada; said Campbell assignor to Harold Langdon McClelland, Toronto, Ontario, Canada Application November 1, 1937, Serial No. 172,100

17 Claims. (Cl. 209—207)

This invention relates to apparatus for and method of separating seeds, and in particular of separating weed seeds from other seeds, by introducing the seeds to a liquid medium and floating off the more floatable seeds. More particularly, this invention relates to apparatus for and method of separating seeds from seeds by utilizing a difference in the wettability of their surfaces as disclosed in Letters Patent of the United States of America No. 2,031,943, dated February 25, 1936, to Frederick C. Dyer and Harold L. McClelland.

In such a separation of seeds from seeds, particularly by the method disclosed in the above mentioned Patent No. 2,031,943, it is essential that the seeds be introduced gradually to an airliquid surface in such a way that momentum of the seeds normal to the surface of the liquid is substantially eliminated. This is achieved by the process as described in the aforementioned patent, but it is found in practice that when the seeds are introduced into a normally motionless surface of liquid, the surface at the point of introduction of the seeds takes the form of a slight wall or wave of liquid, caused by surface tension, over which the floatable or less wettable seeds have to rise. According to this invention this difficulty is overcome by introducing the seeds gradually to, and at an angle of less than 90° to the surface of a liquid which is flowing in the same general direction as the direction in which the seeds are introduced, whereby the more floatable seeds are floated on the surface of the liquid and the less floatable seeds are submerged, and separating the floating seeds from the submerged seeds. By this method the momentum of impact is substantially eliminated and the seeds which are floated and carried along on the surface of the liquid are separated from the submerged seeds by a separating plate which may be arranged in a such a manner as to avoid any interference with the flow of the liquid or any disturbance of the surface which might cause the floating seeds to sink.

The preferred method of effecting separation is by depositing the seeds on a conveyor in a thin layer and introducing the seeds to a liquid separating medium as described in said United States Patent 2,031,943. According to the present invention the conveyor is provided with apertures or spaces of such size that liquid may pass freely therethrough, for example the conveyor may be in the form of a mesh belt, and means are provided for causing liquid to flow through the conveyor and with the conveyor in its direction of travel to float the more floatable seeds from the conveyor and for separating the floating seeds from the liquid.

To obtain satisfactory separation the seeds must be carried on the conveyor in a comparatively thin layer, preferably one seed deep. To spread the seeds on the conveyor a spreading plate or scraper may be used. However, in practice the seeds stick to the back of the spreading plate and drop off in agglomerates destroying the necessary perfection of distribution. This difficulty is overcome by the present invention, by providing a flow of water down the back of the scraper which washes off the seeds and prevents their accumulation thereon.

A further difficulty has arisen owing to the fact that the seeds, which have been previously conditioned in a liquid, when fed to the belt carry liquid between them by surface tension. Unless this liquid is removed during the passage of the seeds with the belt, when the seeds are introduced to the separating liquid there will be a tendency for many of the seeds to sink in the separating liquid. To remove this excess liquid, a drying roller is provided which bears against the underside of the conveyor and is provided with a surface of material to which water adheres or which absorbs water, such as sponge rubber, which will draw the excess liquid through the apertures in the conveyor.

Figure 2:
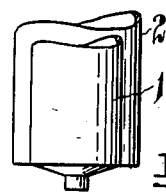
Figure 2:
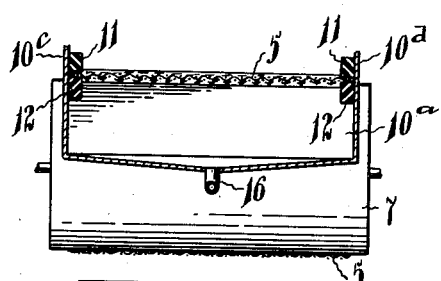
Figure 4:
Figure 5:
Figure 6:
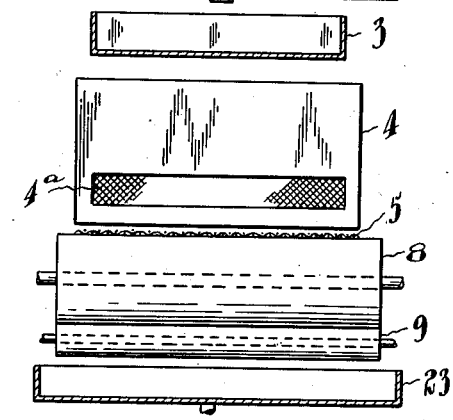
Figure 7:
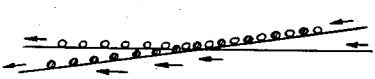

The invention is hereinafter more particularly described and is illustrated in the accompanying drawing, in which:

Fig. 1 is a diagrammatic side elevation of the apparatus;

Fig. 2, a vertical section on the line 2—2 in Fig. 1, on an enlarged scale;

Fig. 3, a vertical section on the line 3—3 in Fig. 1, on an enlarged scale;

Fig. 4, an enlarged diagrammatic view illustrating the water film on seeds immediately after being fed to the belt;

Fig. 5, a similar view showing ideal distribution of water film on the seeds;

Fig. 6, a diagram showing the effect of surface tension on the surface of the separating liquid when the seeds are introduced into a non-flowing body of liquid; and Fig. 7, a diagram illustrating the water surface and seed separation when the seeds are introduced into a flowing body of liquid.

In the drawing like numerals of reference indicate corresponding parts in the different figures.

The seeds are fed from the seed bin 1, and water or some other liquid reagent flows from the reagent mixer 2, to the conditioner 3, where the seeds and conditioning reagent become mixed and are discharged to the spreader or scraper plate 4, and flow down the said plate to the belt 5, which is constructed of a fine wire mesh, the spaces in the mesh not being sufficiently large to permit the seeds to be separated to pass therethrough. The belt 5 is an endless belt which passes around rollers 6 and 7, the roller 6 being a variable speed driving roller which may be rotated by any suitable source of power. The belt travels in the direction of the arrow in Fig. 1, and carries the seeds with it to the separating apparatus as hereinafter described.

The scraper plate 4 is spaced from the belt at its bottom edge just sufficiently to permit a layer of seeds one seed high to pass therebeneath. The scraper plate 4 is arranged at an angle of 90° or less to the surface of the belt relative to that portion of the belt that has passed beneath the scraper. It has been found that there is a tendency for seeds to accumulate on the side of the scraper plate opposite from the side at which the seeds are fed to the belt. The accumulated seeds break off in agglomerates, destroying the perfection of distribution which is necessary to achieve satisfactory separation. To prevent the accumulation of seeds on the plate, an aperture is provided in the spreader plate at a point above its lower edge, which aperture is preferably covered with a fine screen $4^a$, which permits the conditioning liquid to run through the plate from the side to which the seeds are fed and flow down the opposite side, thereby washing it off and preventing seeds from sticking thereto.

Not only is it necessary that the seeds be fed to the separating liquid in a thin layer, but the seeds must also be substantially free from liquid other than the adsorbed films of the conditioning reagent. Fig. 4 shows diagrammatically the normal condition of the seeds immediately after being fed to the belt. In Fig. 4 the white circular objects represent diagrammatically grain seeds, and the dark circular objects represent weed seeds which are to be separated from the grain seeds. The seeds are shown as resting on the belt 5, and the dotted line indicates the surface of the water film on the seeds. If this film persists, when the seeds are introduced into a liquid surface, there will be a tendency for them all to be submerged. In order to remove the excess liquid, the belt 5 passes over a drying roller 8 which has an outer layer of sponge rubber or other suitable absorbent material. This draws the excess liquid through the mesh of the belt. A hard roller 9 bears against the drying roller 8, preferably by spring pressure, and removes excess liquid from the outer layer of the said drying roller as it rotates. The rollers 8 and 9 may be idlers operated by the friction of the belt or may be driven independently or by a belt or other means from the belt roller 6.

Fig. 5 illustrates the surface of the water film after the belt has passed over the drying roller 8, and it will be seen that the spaces between the seeds are practically dry, there being left only a thin surface coating of moisture on the seeds.

A tank 10 is provided, having a comparatively deep portion or well $10^a$ at one end, which is illustrated as wedge-shaped, and a spill-way or lip $10^b$ at the other end extending substantially parallel to the underside of the belt and having its edge bearing against or only slightly spaced from the belt roller 7.

The belt 5 enters the tank at the deep end thereof, passing over the end wall which may be of substantially the same height as the sides, or slightly lower as shown in the diagram Fig. 1. The sides $10^c$ and $10^d$ (see Fig. 2), are spaced apart substantially the width of the belt so that the edges of the belt are close to the sides, so as to substantially eliminate liquid flowing up between the edges of the belt and the sides of the tank. As a further precaution, strips of rubber may be secured to the sides of the tank above and below the edges of the belt. In Fig. 2 the upper strips of rubber are numbered 11, 11 and the lower strips 12, 12. The upper strips of rubber 11, 11 serve to prevent lateral flow of the liquid on the belt. Instead of attaching these strips 11, 11 to the sides of the tank, a continuous resilient strip of rubber or similar material may be attached to the outer side of the belt adjacent its edges. A resilient flap 13 may be provided along the upper edge of the tank at the point where the belt passes into said tank to prevent water from flowing over said end of the tank, and a resilient flap 14 may be provided at the lip $10^b$ of the tank to limit the amount of leakage between the lip and the roller 7.

Liquid, usually water, is pumped by means of a variable speed pump 15 through a suitable pipe 16 to the bottom of the deep part of the tank $10^a$. This water is preferably pumped at such a velocity that it will well up through the mesh screen 5 and flow along on top of the screen at substantially the same velocity as the belt.

A valve $16^a$ in the pipe 16, provides means for varying the amount of flow of the liquid to provide a normal flow. By suitably varying velocity and quantity of the liquid, the angle of the belt and the speed of travel of the belt, the most suitable conditions for the most complete separation of the seeds may be obtained. Since the flow, angle, and speed depend on various factors, including the nature of the seeds to be separated and the construction and capacity of the apparatus, it is not possible to specify the exact velocity or quantity of the liquid, or the angle or speed of the belt, but these may be readily determined by simple experiment by anyone skilled in the art. It should, however, be pointed out that the speed of the belt, and therefore the capacity of the apparatus, may be very greatly increased when the belt is introduced to flowing liquid as described in this specification, instead of being introduced into still liquid as has been done heretofore.

The belt is illustrated in Fig. 1 as sloping downwardly in the direction of travel. It is important that the slope be not so great that the liquid which passes through the belt will run on the belt at a greater speed than the belt. To effect the gradual introduction of the seeds into the liquid the belt must be arranged at an angle of less than 90° to the surface of the liquid. The nearer the belt is to the horizontal, the more easily may the flow of liquid be regulated with respect to the speed of the belt. In fact, the belt may be substantially horizontal, passing over the upper edge of the sides and ends of the tank, with strips of rubber or similar material arranged above the belt at each side thereof to prevent the liquid from spilling over the sides of the belt. By tilting the machine, or other suitable means, the slope of the belt may be varied. Any suitable means, not shown, such as a variable speed motor or change-speed gearing may be used for varying the speed of the belt.

Fig. 6 shows graphically in a slightly exaggerated manner, the undesirable condition which is apt to result when a seed on the belt, which is difficult to wet, is introduced into a substantially motionless body of water. It will be observed that the surface tension curve of the water takes the form of a wall of liquid or a wave over which the more floatable seeds must climb if they are to be separated from the less floatable seeds. In the diagram, the straight sloping line indicates the belt and the dark and light coloured circular objects illustrate the seeds on the belt. The other line which intersects the belt is the liquid surface line, showing the surface tension curve at the point where the belt enters the liquid. The diagram shows all the seeds sinking, although in practice under suitable conditions many of the more floatable seeds would actually float off on the surface. Fig. 7 shows the ideal condition where the seeds are introduced into water flowing at substantially the same velocity as the belt is travelling and passing through the meshes in the belt. In this diagram, as in the previous one, the belt and the surface of the liquid are indicated by the intersecting lines, and it will be noticed that the surface tension curve shown in Fig. 6 has been eliminated. The dark objects represent the weed seeds and the light objects the grain seeds, which are illustrated as being perfectly separated, the grain seeds passing along the surface of the water and the weed seeds being submerged.

It may be here observed that although the conveyor for the seeds has been referred to as a wire mesh belt in the specific embodiment of the invention described, other suitable materials may be used instead of wire in the construction of the conveyor, and a closer approximation to the ideal condition illustrated in Fig. 7 may be obtained by the use of a more wettable material than wire.

A skimming or separating plate 17 is arranged substantially parallel to the surface of the water and slightly below the same at its normal flow. The normal flow is such as will create sufficient depth of liquid on the belt to fully separate the floating seeds from the submerged seeds. The floating seeds pass over this plate, as illustrated by the dotted line in Fig. 1, and are directed into a strainer 18 of some suitable kind, which is preferably provided with a mesh bottom for carrying off the liquid and a discharge funnel or other discharge for the seeds. The means for separating the water from the seeds are illustrated diagrammatically and may take any desired form. The separated water is carried by means of a pipe 19 back to the pump, from which it is pumped back into the tank 10.

The submerged seeds pass beneath the separating or skimming plate 17 and fall over the roller 7 into a strainer 20, as illustrated by the dotted line in Fig. 1. The strainer 20 preferably has a mesh bottom or other means for separating the seeds from the water. The water is carried off through a pipe 21 to the pump 15. A funnel or other means is provided for carrying off the seeds. A supply of fresh water to the pump may be introduced through the pipe 22, to replace the water lost in the separating process.

A trough or tank 23 may be provided beneath the top run of the belt at the point where the seeds are fed thereto, beneath the drying roller, and beneath such other parts of the belt as conditioning liquid from the seeds is likely to fall through. The conditioning liquid collected in this trough 23 may be carried to a pump 24 and pumped back through a pipe 25 to the reagent mixer 2. In this way two separate circuits may be maintained, one for the separating liquid and the other for the conditioning liquid. This is important, since it is frequently desirable to have a separating liquid of a different character from the conditioning liquid and to prevent them from becoming mixed.

As a further means of maintaining the separate circuits, a drying roller similar to the roller 8 may be used to dry the belt after it has passed over the tank 10 and around the roller 7. In this way the separating liquid will be prevented from being carried back in the meshes of the belt to the point where the seeds are fed thereto.

It will be seen from the above description that we have devised an improved method and apparatus for the separation of seeds which achieves our object of overcoming the difficulties set forth in our preamble hereto.

It is obvious that the apparatus and method described may be used for the separation of particles other than seeds which are separable in a liquid medium by flotation.

What we claim as our invention is:

1. Apparatus for separating seeds from seeds, including means for conditioning the seeds with a liquid; a travelling conveyor to which the seeds are fed and which carries the seeds to the separating medium, said conveyor having apertures therein to permit drainage of conditioning liquid from the seeds; and means for drawing surplus liquid from the seeds through the apertures in the conveyor, located between the point at which the seeds are fed to the conveyor and the point at which they enter the separating medium, said means including a roller having a surface of absorbent material over which the conveyor passes.

2. Apparatus for separating seeds from seeds, including means for conditioning the seeds with a liquid; a travelling conveyor to which the seeds are fed and which carries the seeds to the separating medium, said conveyor having apertures therein to permit drainage of conditioning liquid from the seeds; and means for drawing surplus liquid from the seeds through the apertures in the conveyor, located between the point at which the seeds are fed to the conveyor and the point at which they enter the separating medium, said means including a roller having a surface of absorbent material over which the conveyor passes, and a roller which bears against the aforesaid roller to remove liquid from the said roller.

3. Apparatus for separating seeds from seeds, including a travelling conveyor on which the seeds are carried in a thin layer, said conveyor having apertures or spaces therein of such size that liquid may pass freely therethrough; means for causing liquid to flow upwardly through the conveyor and with the conveyor in its direction of travel to float the more floatable seeds from the belt; means for preventing lateral flow of the liquid above the conveyor; and means for separating the floating seeds from the liquid.

4. Apparatus constructed as set forth in claim 3, including means for regulating the speed of the conveyor and the flow of liquid.

5. Apparatus for separating seeds from seeds, including a travelling conveyor on which the seeds are carried in a thin layer, said conveyor having apertures or spaces therein of such size that liquid may pass freely therethrough; means for causing liquid to flow upwardly through the conveyor and with the conveyor in its direction of travel, whereby the more floatable seeds are floated on the liquid and the less floatable seeds are submerged in the liquid, the seeds being carried some above and some below the surface of the liquid in the direction of travel of the conveyor; and a separating plate arranged below the surface of the liquid for separating the floating seeds from the submerged seeds.

6. Apparatus for separating seeds from seeds, including a travelling conveyor on which the seeds are carried in a thin layer, said conveyor having apertures or spaces therein of such size that liquid may pass freely therethrough; means for causing liquid to flow upwardly through the conveyor and over the conveyor in its direction of travel, whereby the more floatable seeds are floated on the surface of the liquid and the less floatable seeds pass beneath the surface of the liquid, the seeds being carried some above and some below the liquid surface in the direction of travel of the conveyor; and a separating plate arranged below and substantially parallel to the surface of the liquid for separating the floating seeds from the submerged seeds.

7. Apparatus for separating seeds from seeds, including a travelling conveyor on which the seeds are carried in a thin layer, said conveyor having apertures or spaces therein of such size that liquid may pass freely therethrough; a tank, adapted to hold liquid, the conveyor being arranged to pass over the otherwise open top of the tank in close contact with the sides of the tank; means for passing liquid into the tank under pressure beneath the conveyor, whereby the liquid in the tank will well up through the conveyor and travel with the conveyor and at substantially the same speed as the conveyor to and over the end of the tank; and means for separating seeds which float on the liquid from seeds which are submerged therein.

8. Apparatus constructed as set forth in claim 7, in which means are provided for varying the angle of the conveyor relative to the horizontal.

9. Apparatus for separating seeds from seeds as set forth in claim 7, in which means are provided on each side of the conveyor for preventing liquid from flowing between the sides of the tank and the edges of the conveyor.

10. Apparatus for separating seeds from seeds as set forth in claim 7, in which means are provided between the lower end of the tank and the conveyor for preventing water from flowing out of the tank beneath the conveyor.

11. Apparatus for separating seeds from seeds as set forth in claim 7, in which means are provided between each end of the tank and the conveyor for preventing water from flowing out of the tank beneath the conveyor.

12. Apparatus for separating seeds from seeds, including a travelling conveyor on which the seeds are carried in a thin layer, said conveyor having apertures or spaces therein of such size that liquid may pass freely therethrough; a tank, adapted to hold liquid, one end of the tank being lower than the other end, the conveyor being arranged to pass over the higher end and longitudinally over the tank and at an angle to the horizontal and over the lower end thereof; means for passing liquid into the tank under pressure beneath the conveyor, whereby the liquid in the tank will well up through the conveyor and travel with the conveyor and at substantially the same speed as the conveyor to and over the lower end of the tank; means above the conveyor to prevent lateral flow of the liquid on the conveyor; and means for separating seeds which float on the liquid from seeds which are submerged therein.

13. Apparatus for separating seeds from seeds, including means for conditioning the seeds with a liquid; a travelling conveyor to which the seeds are fed, and which carries the seeds to the separating medium, said conveyor having apertures therein to permit drainage of conditioning liquid from the seeds; means for removing excess liquid from the seeds, located between the point at which the seeds are fed to the conveyor and the point at which they enter the separating medium, said means including a roller having an outer surface of absorbent material, such as sponge rubber, over which the conveyor passes; and means for causing liquid to flow upwardly through the conveyor and with the conveyor in its direction of travel to float the more floatable seeds from the conveyor.

14. In apparatus for separating seeds from seeds, a conveyor adapted to carry the seeds to a separating medium; a scraper plate spaced from and arranged transversely of and at an angle to the plane of the surface of the conveyor, for spreading the seeds on the belt in a thin layer; and means for causing a flow of liquid down the back of the scraper plate to prevent accumulation of seeds on said back of the plate.

15. In apparatus for separating seeds from seeds, a conveyor adapted to carry the seeds to a separating medium; a scraper plate spaced from and arranged transversely of and at an angle to the plane of the surface of the conveyor, for spreading the seeds on the belt in a thin layer; and means for conditioning the seeds with a liquid and feeding the wetted seeds to the front of the scraper plate, the said scraper plate having an aperture formed in the plate intermediate its upper and lower edges through which conditioning liquid from the seeds may pass and flow down the back of the plate to prevent the accumulation of seeds on said back of the plate.

16. In apparatus for separating seeds from seeds, a conveyor adapted to carry the seeds to a separating medium; a scraper plate spaced from and arranged transversely of and at an angle to the plane of the surface of the conveyor, for spreading the seeds on the belt in a thin layer; means for conditioning the seeds with a liquid and feeding the wetted seeds to the front of the scraper plate, the said scraper plate having an aperture formed in the plate intermediate its upper and lower edges through which conditioning liquid from the seeds may pass and flow down the back of the plate to prevent the accumulation of seeds on said side of the plate; and a mesh screen covering the aperture.

17. Apparatus for separating seeds from seeds, including means for conditioning the seeds with a liquid; a travelling conveyor to which the seeds are fed and which carries the seeds to the separating medium, said conveyor having apertures therein to permit drainage of conditioning liquid from the seeds; and absorbent means for drawing surplus liquid from the seeds through the apertures in the conveyor, said means engaging the under side of the conveyor between the point at which the seeds are fed to the conveyor and the point at which they enter the separating medium.

FRED'K. C. DYER.
ALBERT W. CAMPBELL.